United States Patent
Onodera et al.

[11] Patent Number: 5,988,005
[45] Date of Patent: Nov. 23, 1999

[54] ELECTRIC POWER STEERING UNIT

[75] Inventors: Tsugio Onodera, Azuma-mura; Tadao Kodaira, Maebashi; Yoshiaki Taniguchi, Oi-machi, all of Japan

[73] Assignee: Mitsuba Corporation, Cunma, Japan

[21] Appl. No.: 09/062,818

[22] Filed: Apr. 20, 1998

[30] Foreign Application Priority Data

Jul. 4, 1997 [JP] Japan ..................................... 9-179591

[51] Int. Cl.$^6$ ....................................................... B62D 5/04
[52] U.S. Cl. ......................... 74/388 PS; 74/422; 74/109; 180/6.44
[58] Field of Search ............................ 74/388 PS, 89.15, 74/424.8 R, 459, 422, 89.11, 109; 318/489, 486; 180/6.28, 6.44

[56] References Cited

U.S. PATENT DOCUMENTS

| | | | |
|---|---|---|---|
| 4,572,314 | 2/1986 | Anguera | 180/79.1 |
| 4,653,602 | 3/1987 | Anders et al. | 180/79.1 |
| 5,623,409 | 4/1997 | Miller | 364/424.051 |
| 5,650,701 | 7/1997 | Shimizu et al. | 318/489 |
| 5,711,396 | 1/1998 | Joerg et al. | 180/444 |

*Primary Examiner*—Tamara L. Graysay
*Assistant Examiner*—David Fenstermacher
*Attorney, Agent, or Firm*—McCormick, Paulding & Huber

[57] ABSTRACT

An electric power steering unit comprises a rack-shaft 2 to be coupled to the guiding wheels of a vehicle, a housing A for slidably containing the rack-shaft 2 and holding therein a coupling section 6 for causing the teeth of the rack-shaft 2 to engage those of a pinion arranged on the steering column 5 linked to the steering handle of the vehicle and an electric motor 1 coaxially arranged around the rack-shaft 2, which the rotary force is transmitted to the rack-shaft 2 by way of a ball screw mechanism 3 as the steering assisting power. A nut section 19 of the ball-screw mechanism 3 is rotatably supported by a housing B separately formed from the housing A, in a state of supporting the armature shaft 11 of the electric motor 1. The rack-shaft 2 is axially movable and supported by two points of support, one at the coupling section and the other at the nut section supported by the housing B. Thus, the rack-shaft is not supported by three points such as the conventional power steering unit but supported by two points, the precision requirements for the components are eased and hence the manufacturing cost thereof is reduced.

1 Claim, 5 Drawing Sheets

ELECTRIC POWER STEERING UNIT

BACKGROUND OF THE INVENTION

1. Field of the Invention

This invention relates to an electric power steering unit to be used for a vehicle and, more particularly, it relates to a field of technology effectively applicable to electric power steering gears to be used for rack and pinion type steering systems.

2. Related Art Statement

In recent years, most vehicles are equipped with a so-called power steering gear, and various type power steering unit, such as a hydraulically or electrically operated type power steering unit has been designed to assist the steering power of the vehicle. In these electric power steering units, as one for applicable to rack and pinion type steering systems, a unit which the steering assisting power is obtained by an electric motor arranged coaxially with a rack-shaft, as Japanese Patent Application Laid-Open No. 8-98451, is known.

Such an electric power steering unit shown in FIG. 4, comprises an electric motor 52 arranged coaxially with a rack-shaft 51 so that the steering assisting power generated by the electric motor 52 is transmitted to the rack-shaft 51 by way of a ball screw mechanism 53. Then, the guiding wheels of the vehicle can be turned by utilizing both the manual steering power of the driver and the steering assisting power, so that driver's burden in steering is reduced.

In that case, the rack-shaft 51 is linked to the guiding wheels (which hereinafter may simply be referred to as "the wheels") typically by way of tie rods or knuckle arms arranged at the respective opposite ends thereof and also linked to the steering column 54 that is coupled to the steering wheel (which hereinafter may be referred to as "the handle") by way of a rack and pinion gear so that it may be reciprocatively moved in the horizontal directions of FIG. 4 as the steering operation by the driver. The electric motor 52 has a cylindrical yoke 55 containing coaxially therein a cylindrical armature shaft 56 and a field device 57 and is fed with power from a power supply section 58. The field device 57 comprises magnets 59 arranged on the inner peripheral portion of the yoke 55 and an armature core 60 arranged on the outer peripheral portion of the armature shaft 56. The rotary power generated by the electric motor 52 is transmitted to the rack-shaft 51 and the power is converted into the reciprocatively movement by way of a ball screw mechanism 53 arranged at the left end of the armature shaft 56 in FIG. 4, so that steering power is assisted.

With a power steering unit having the above described configuration, the rack-shaft 51 is supported at two points including the coupling section connecting itself to the steering wheel 54 and the ball-screw mechanism 53. Firstly, since the rack-shaft 51 is coupled at an end thereof to the steering wheel 54 by means of a gear engagement by a rack and pinion gear system, rigidity of this point is high and it provides a point of support for the rack-shaft 51. Additionally, a housing 61 holding the coupling section is rigidly secured to the vehicle main body so that the rack-shaft 51 is in effect supported by the vehicle main body. Secondly, rack-shaft 51 is supported at the opposite end thereof by a ball-screw mechanism 53 arranged at an end of the armature shaft 56. The ball-screw mechanism 53 comprises a nut section 62 and a screw section 63 that are tightly combined together with balls 64 interposed therebetween. The nut section 62 is press-fit into and caulked against the armature shaft 56 to provide another point of support for the rack-shaft 51.

The armature shaft 56 is rotatably held by the ball-screw mechanism 53 and an angular bearing 65. Thus, the ball-screw mechanism 53 provides a point of support for the armature shaft 56, while the housing 61 provides another point of support for the armature shaft 56 as the angular bearing 65 is tightly fitted to the housing 61.

The performance of a power steering unit of the type under consideration is typically measured in a manner as described below. If the electric motor 52 is installed after fitting the nut section 62 of the ball-screw mechanism 53 to the armature shaft 56 and subsequently the yoke 55 is placed in position, the entire unit is covered by outer shell elements so that the performance of the electric motor 52 can be determined only by way of the thrust of the rack-shaft 51 because it is no longer possible to directly measure the performance of the electric motor 52 itself. Therefore, for the purpose of the present invention, the electric motor 52 is measured for its performance before fitting the nut section 62 to the armature shaft 56. In other words, the unit is assembled and covered by the yoke 55 without the nut section 62. Next, the revolutions per minute and the torque of the electric motor 52 are measured by using the space where the nut section 62 is to be installed. After the operation of measuring the performance of the electric motor 52 is over, the yoke 55 is removed temporarily and the nut section 62 is placed in position, then the yoke 55 is put back again to complete the assembling operation.

However, with such a conventional power steering unit, while the rack-shaft 51 apparently has two points of support, it in effect has three points of support because the armature shaft 56 linked to the rack-shaft 51 by way of the ball-screw mechanism 53 is also supported by the angular bearing 65 that is fitted to the housing 61, so that consequently the rack-shaft 51 can be more often than not subjected to friction due to jarring, twisting and misaligning of related components and that can give rise to problems, such as jarring, an unpleasant steering feeling and reluctant movement of the steering wheel in recovering. While, since very severe precision is required for each component and assembling to avoid these problems, there is such a problem that the manufacturing cost becomes high in terms of machining precision and product management.

Additionally, with a conventional power steering unit, the yoke 55 installed in position has to be temporarily removed to measure the performance of the electric motor 52 and then put back in position once again. In addition to the fact that this is a cumbersome procedure, there arises a problem that the performance of the electric motor 52 may behave differently when it is measured for performance and when it is completely assembled. In this case, because the performance of the electric motor 52 is not tested at the complete assembling state and its performance is only estimated on the basis of the data obtained before re-assembling.

On the other hand, it is difficult to combine an armature and a yoke mounted with already-magnetized magnets, and usually there is employed such a method that non-magnetized yoke is mounted in a finished arrangement and thereafter the yoke is magnetized. However, since the yoke 55 is removed to measure the performance of the electric motor 52 after magnetizing the magnets, the yoke 55 is still accompanied by the problem of removing. In the first place, it is not easy to pull out the magnetized yoke 55 from its position. Secondly, the yoke 55 attracts the armature vigorously and abut it due to its magnetic force to damage the surrounding elements.

SUMMARY OF THE INVENTION

An object of the present invention is to provide a power steering unit comprising a rack-shaft that has two points of support instead of three points of support of conventional power steering units and can ease precision requirements to reduce the cost of manufacturing the power steering unit.

Another object of the present invention is to provide a power steering unit comprising an electric motor that can be measured easily for performance and is free from the above identified problems of a magnetized yoke.

Still another object of the present invention is to provide a power steering unit in which a power supply section thereof is assembled in a state of high rigidity and high accuracy.

According to the invention, there is provided an electric power steering unit comprising a rack-shaft to be coupled to the guiding wheels of a vehicle, a first housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering. The nut section of the ball-screw mechanism is rotatably supported by a second housing arranged independent of the first housing, in a state of supporting the armature shaft and the rack-shaft is axially movable and supported at two points of support, one at the coupling section and the other at the nut section supported by the second housing. And a power supply section of the electric motor is arranged on a side of the second housing relative to a field device of the electric motor.

It is possible to assemble the power supply section in a state of high rigidity and high accuracy, and accordingly, to obtain reduction in brush sound, reduction in lead angle displacement, improvement in commutation, etc.

The above-described and other objects, and novel feature of the present invention will become apparent more fully from the description of the following specification in conjunction with the accompanying drawings.

BRIEF DESCRIPTION OF THE DRAWINGS

FIG. 3 is a perspective view showing a state of fitting a coupler to a power supply terminal;

DESCRIPTION OF THE PREFERRED EMBODIMENT (Embodiment 1)

Figure 1:
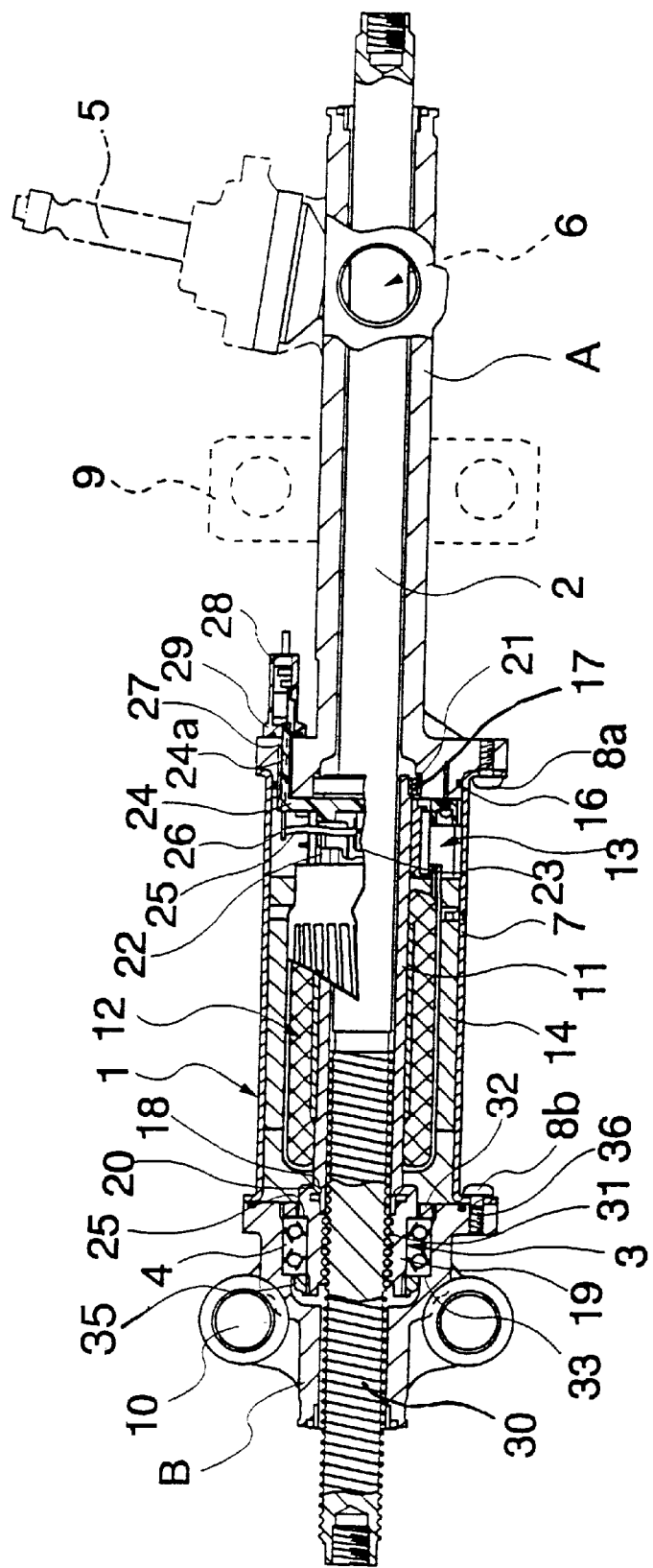
FIG. 1 is a schematic cross sectional view of a first embodiment of power steering unit according to the invention, showing its overall configuration.
Figure 2:
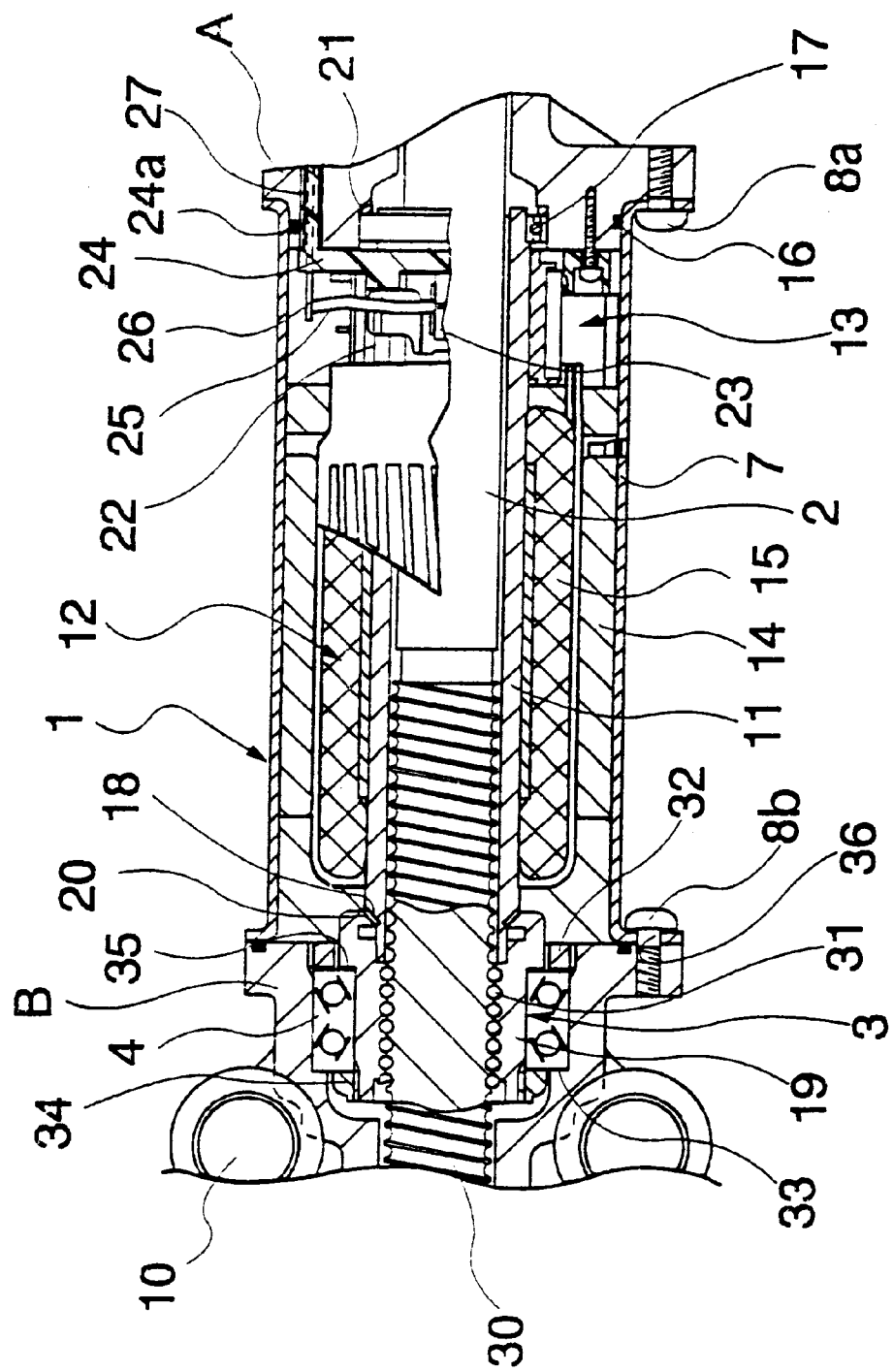
FIG. 2 is an enlarged schematic cross sectional view of the embodiment of power steering unit of FIG. 1, showing its principal area.

Now, the invention will be described in greater detail by referring to the accompanying drawings that illustrate preferred embodiments of the invention. FIG. 1 is a schematic cross sectional view of a first embodiment of electric power steering unit according to the invention, showing its overall configuration. FIG. 2 is an enlarged cross sectional partial view of the embodiment of power steering unit of FIG. 1, showing its principal area.

As seen from FIGS. 1 and 2, the electric power steering unit (hereinafter referred to as "power steering unit") of the first embodiment is provided with an electric motor 1 having a hollow central area and arranged around a rack-shaft 2 as in the case of the conventional power steering units shown in FIG. 4 and, for example, the unit is fitted to the steering gear of the wheels of a vehicle that are typically the front wheels. The steering assisting power generated by the electric motor 1 is transmitted to the rack-shaft 2 via a ball screw mechanism 3 to reduce the physical load for steering the vehicle on the part of the driver. The power steering unit according to the invention has a remarkable feature that the rack-shaft 2 is supported by two points by means of being integrally arranged the ball-screw mechanism 3 with an angular bearing 4, as a result, the precision requirements of parts and assembling can be eased.

As shown in FIG. 1, the power steering unit further comprises a housing A (first housing) and a housing B (second housing), which are securely coupled to yoke 7 of the electric motor 1 by means of a plurality of respective screws 8a and 8b, and the rack-shaft 2 is arranged in them in such a way that it maybe moved to the right and the left direction in FIG. 1. Then, the power steering unit 1 is fitted to the vehicle main body by means of a bracket 9 and fitting holes 10 of the housing B and, at the same time, the wheels are linked to the respective ends of the rack-shaft 2 by means of tie rods or knuckle arms.

The housing A is a hollow member typically made of cast iron or die-cast aluminum and a coupling section 6 is arranged at the right side end of the unit in FIG. 1 for coupling the rack-shaft 2 with the steering column 5 of the vehicle that is further linked to the steering wheel. In this coupling section 6, a pinion (not shown) arranged on the steering column 5 and the teeth of a rack arranged on the outer side portion of the rack-shaft 2 are engaged with each other so that the rotary motion of the steering column 5 is converted into a reciprocative motion of the rack-shaft 2 that moves right and left direction in FIG. 1. In this case, the coupling section is so designed as to support the rack-shaft 2 by gear engagement to provide a point of support for the rack-shaft 2 as in the case of conventional power steering units. Note, a torque sensor (not shown) is arranged on the coupling section 6 to detect the torque of the steering column 5 so that the power output of the electric motor 1 may be controlled as a function of the detected torque.

The electric motor 1 has a cylindrical yoke 7 containing coaxially therein a cylindrical armature shaft 11 and a fie 12. The rack-shaft 2 is assembled to runs through the inside of the armature shaft 11. The field device 12 comprises a plurality of magnets 14 arranged on the inner peripheral surface of the yoke 7 and an armature core 15 arranged on the outer peripheral portion of the armature shaft 11 and is fed with electric power from a power supply section 13.

The yoke 7 is a hollow and cylindrical member made of iron and having a profile of a cylindrical pipe with a substantially constant thickness. It contains therein the field device 12 and the power supply section 13. The yoke 7 is securely and airtightly connected to the housing A at the right side end thereof in FIG. 1 by means of a plurality of screws 8a and an O-ring 16. On the other hand, it is securely connected to the housing B at the left side end in FIG. 1 also by means of a plurality of screws 8b. As will be described hereinafter, the operation of linking these components is conducted while correcting the misalignment, if any, of the rack-shaft 2.

The magnets 14 of the field device 12 operates as field poles and are arranged peripherally at regular intervals in the yoke 7. On the other hand, the armature shaft 11 is held at an end thereof (the right side end in FIGS. 1 and 2) by a bearing 17 fitted to the housing A and provided on the other end (the left side end in FIGS. 1 and 2) with a tapered spline 18, which is engaged with a corresponding spline 20 formed at an end of a nut section 19 of the ball-and-screw mechanism 3 so that the rotary motion of the armature shaft 11 is transmitted to the nut section 19. Note that the armature shaft 11 of this embodiment has a simplified profile and is down-sized to reduce the manufacturing cost as well as the force of inertia it produces if compared with its counterpart of the conventional power steering unit of FIG. 4 and hence the electric motor 1 can also be down-sized to show a quick response time.

On the other hand, a rubber member 21 is fitted to a right side portion of the bearing 17 to urge the armature shaft 11 against the side of the nut section 19 by means of the elastic force of the rubber member 21. Thus, the spline 18 is urged against and engaged with the spline 20 so that the rotary motion of the armature shaft 11 is securely transmitted to the nut section 19. Because of the rubber member 21 arranged on the right side of the bearing 17, the armature shaft 11 is held in position but allowed to move to a small extent. Note that the rubber member 21 can be replaced by an equivalent member that may be made of any appropriate material and have any contour so long as it axially urges the armature shaft 11. For example, it may be replaced by a coned disc spring, a wave washer or a member made of synthetic resin.

Next, the power supply section 13 is designed to feed the armature with electricity and comprises a commutator 22 rigidly secured to the armature shaft 11 and a brush 23 held in contact with the peripheral surface of the commutator 22 to provide electric contact points between them. The brush 23 is held in a brush holder formed integrally with a brush holder stay 24 that is made of synthetic resin and pressed against the commutator 22 under a predetermined pressure by means of an elastic member (not shown). On the other hand, a terminal plate 26 having an end connected to a pig tail 25 of the brush 23 by spot welding is made to run through a projecting section 24a of the brush holder stay 24 by means of an insertion molding technique. Then, the brush holder stay 24 is secured to the housing A with screws in such a way that the front end of the projecting section 24a is projecting to the outside through a hole 27 of the housing A. Thus, the terminal plate 26 projects from the housing A with the projecting section 24a of the brush holder stay 24 to form a power supply terminal.

Figure 3:
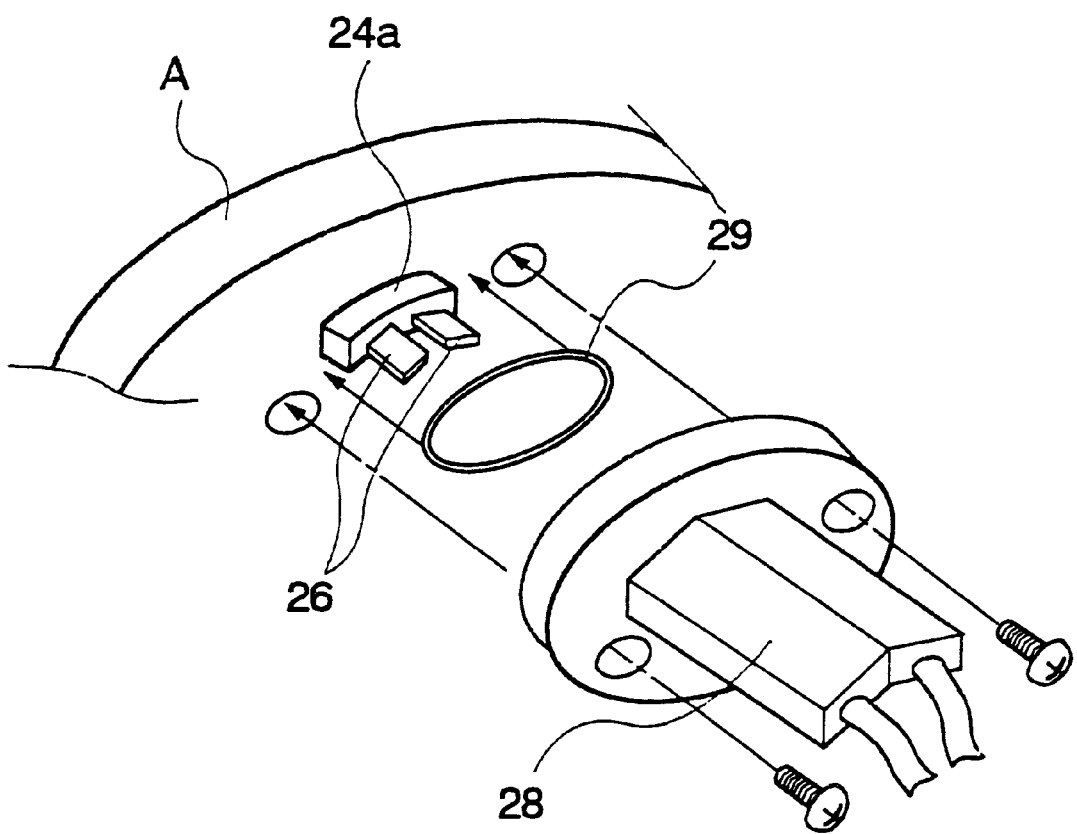
FIG. 3 is a schematic perspective view of the power supply terminal of the embodiment of FIG. 1, illustrating how a coupler is fitted thereto.

FIG. 3 is a schematic perspective view of the power supply terminal, illustrating how a coupler 28 is fitted thereto. Referring to FIG. 3, the terminal plate 26 projects to the outside of the housing A with the projecting section 24a to provide a male terminal and a waterproof female coupler 28 is secured to it by means of screws with an O-ring 29 interposed therebetween. It should be noted here that any interruption to the supply of power to the electric motor 1, if instantaneous, is not allowed from the viewpoint of assisting the manual power applied to the steering wheel by the driver for maneuvering the vehicle. Since the coupler 28 is rigidly secured to the housing A by means of screws in this embodiment of power steering unit, the coupler 28 is prevented from being unfastened from the power supply due to vibrations to improve the reliability of the unit.

Figure 4:
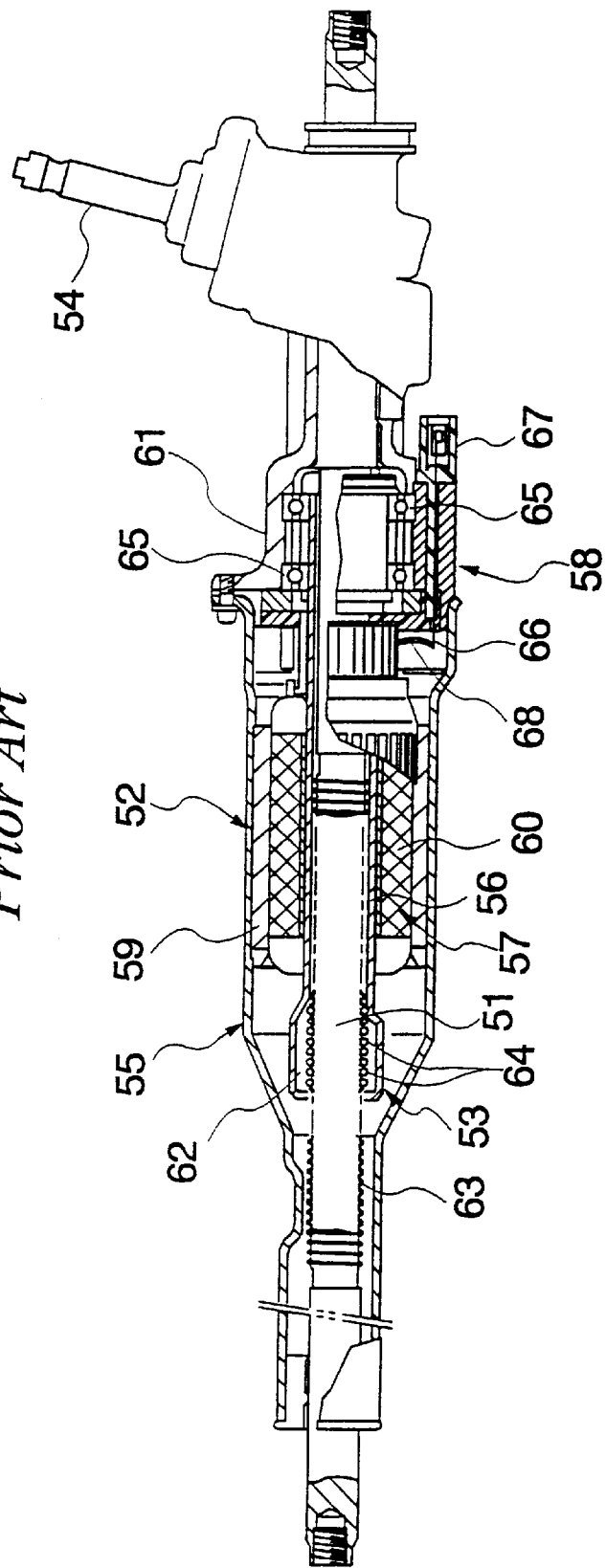
FIG. 4 is a schematic cross sectional view of a conventional power steering unit, showing its overall configuration.

Meanwhile, in the conventional power steering unit, the terminal is secured to the housing 61 by inserting a coupler 67 (male side) formed integrally with the terminal 66 and rigidly securing an end of the terminal 66 to a pig tail 68 of the brush as shown in FIG. 4. With this arrangement of the conventional power steering unit, the terminal 66 and the pig tail 68 are connected to each other by spot welding after fitting the coupler 67 to the housing 61. Therefore, with the conventional power steering unit, the welding operation has to be carried out by rigidly anchoring the relatively large housing 61 and it makes the operation rather cumbersome. Additionally, since the coupler 67 is not adapted to disassembling, either the housing 61 has to be replaced or the pig tail 68 and the terminal 66 have to be cut off from each other to replace the brush. In the latter case, the new brush has to be connected to the pig tail by spot welding for another time.

This embodiment employs a terminal configured in a manner as described above, thus, in this embodiment, the brush holder stay 24 and the pig tail 25 are connected with each other by spot welding so that they may collectively be handled efficiently as a subassembly. Additionally, they can be easily separated from the housing A so that only the brush holder stay 24 have to be replaced when the brush 23 is replaced. Thus, the number of components that have to be replaced for maintenance and consequently the efficiency of maintenance operation is significantly improved. Further, the number of parts is smaller by one in comparison with the conventional case (the coupler 67 of FIG. 4 can be dispensed with), the present construction contributes to reduction in parts cost.

The housing B is, like the housing A, a hollow member typically made of cast iron or die-cast aluminum and provided in the inside with a ball-and-screw mechanism 3. The ball-and-screw mechanism 3 per se is known and comprises a nut section 19, a screw section 30 formed on the outer peripheral wall of the rack-shaft 2 and a number of balls 31 arranged between the nut section 19 and the screw section 30. The rack-shaft 2 is supported by the nut section 19 in such a way that its rotary motion around the axis of rotation is restricted but it is reciprocated right and left direction in FIG. 1 as the nut section 19 is rotated.

The nut section 19 is axially rotatable relative to the housing B with an angular bearing 4 interposed therebetween and securely fitted to the housing B. Thus, unlike the conventional power steering unit of FIG. 4 wherein the nut section of the ball-and-screw mechanism and the angular bearing are independently arranged, the nut section 19 of the ball-and-screw mechanism 3 and the angular bearing 4 are combined to form a unitary member and arranged in the housing B that is separated from the housing A in this embodiment of power steering unit according to the invention. Note that the angular bearing 4 is securely held between a bearing holder ring 32 screwed into an opening of the housing B and a stepped section 33 formed in the housing B to restrict its axial movement. The relative axial movement of the nut section 19 and the angular bearing 4 is restricted by another bearing holder ring 34 screwed into the left end of the nut section 19 and another stepped section 35 formed on the outer peripheral wall of the nut section 19.

As mentioned above, the rack-shaft 2 of this embodiment is supported in the housing B by the nut section 19 that is held by the angular bearing 4 rigidly fitted to the housing B. Thus, the nut section 19 provides another point of support for the rack-shaft 2. While the armature shaft 11 is supported by a bearing 17 at the side where the commutator 22 is arranged, this bearing 17 contains balls in the inside and hence may produce a slight gap between the inner ring and the outer ring thereof. In other words, the rack-shaft 2 of this embodiment has only two points of support, one at the coupling section 6 of the housing A and the other at the nut section 19 of the ball-screw mechanism 3. At this point, the power steering unit of this invention is different from the conventional one which has substantially three points of support.

On the other hand, a tapered spline 20 is formed at the right end of the inner cylindrical space of the nut section 19 and engaged with a corresponding spline 18 of the armature shaft 11. Thus, the armature shaft 11 and the nut section 19 are coupled firmly so that they can be handled as a unitary member. More specifically, the armature shaft 11 is supported by the bearing 17 and the nut section 19 and the rotary motion of the armature shaft 11 is effectively transmitted to the nut section 19. Therefore, as the armature shaft 11 rotates, the nut section 19 is rotated accordingly to reciprocatively move the rack-shaft 2 right and left direction under the effect of the ball-and-screw mechanism 3.

Note, since the rack-shaft 2 is bent by the external force typically applied to it by the wheels, a clearance considering the quantity of the bending has to be provided between the rack-shaft 2 and the armature shaft 11. Conventionally, the relationship between the quantity of the bending and the points where the rack-shaft 2 is supported is not considered and the supporting points are arbitrarily selected. As a result, the clearance has to be made excessively large to accommodate any possible bending of the rack-shaft 2 and baffle any attempt to down-size the unit. To the contrary, in view of the fact that the rack-shaft 2 is supported at two points of the ball-and-screw mechanism 3 and the coupling section 6, the bending of the rack-shaft 2 is minimized by equalizing the distances from the opposite ends of the rack-shaft 2 to the respective supporting points in this embodiment of power steering unit, provided that the rack-shaft 2 shows a same rigidity at the two supporting points. If the rack-shaft 2 shows different rigidity values at the two supporting points, the bending of the rack-shaft 2 can be minimized by appropriately selecting the supporting points, taking the ratio of the rigidity values into consideration. The clearance between the rack-shaft 2 and the armature shaft 11 can be minimized by minimizing the bending of the rack-shaft 2 to reduce the overall dimensions and hence the manufacturing cost of the unit.

The above described embodiment of power steering unit is assembled in a manner as described below.

Firstly, said four major components are prepared. A rubber member 21, a bearing 17, a brush holder stay 24 and other parts are fitted to the housing A. Then, magnets 14 and other parts are fitted to the inside of the yoke 7. An armature core 15, an commutator 22 and other parts are arranged on the armature shaft 11. A ball-screw mechanism 3 combining an angular bearing 4 and a rack-shaft 2 are arranged in the housing B.

Then, the housing A and the armature shaft 11 are fitted to each other and the yoke 7 is secured to the housing A by means of screws. The housing B carrying the rack-shaft 2 and the yoke 7 are secured to each other also by means of screws. Thereafter, the rack-shaft 2 put into the housing A is linked to the steering column 5 and the teeth of the pinion on the steering column 5 are made to engage with those of the rack on the rack-shaft 2.

Since the ball-screw mechanism 3 is separable from the armature shaft 11 of this embodiment, the performance of the electric motor 1 per se can be measured at this stage of assembling. More specifically, an appropriate bearing is used to receive the end of the armature shaft 11 so that the electric motor 1 may be measured for the revolutions per minute and the torque through there.

For fitting the housing B to the yoke 7, the spline 18 formed on the end of the armature shaft 11 is engaged with the spline 20 formed on the nut section 19, after then the yoke 7 and the housing B are secured to each other by means of screws. Thus, with this embodiment of power steering unit, the housing B can be secured to the yoke 7 after positionally regulating it in order to prevent the rack-shaft 2 from falling down and/or shaking so that any misalignment on the part of the rack-shaft 2 due to eccentricity from the center may be absorbed and corrected. Note that yoke 7 is provided with a hole 36 for receiving a screw 8b having a diameter greater than that of the screw 8b so that the housing B may be positionally regulated by utilizing the clearance between the screw 8b and the screw hole 36.

As pointed above, the rack-shaft 2 of this embodiment has only two points of support, one being the coupling section 6 for coupling the rack-shaft 2 to the steering column 5 located on the side of the housing A, the other being the nut section 19 on the side of the housing B and it is supported only by the coupling section 6 when the housing B is arranged in position. Additionally, as described above, the armature shaft 11 that is supported by the bearing 17 is somewhat floating. Therefore, when the housing B is arranged in position the housing B can be subjected to positional adjustment according to any misalignment of the rack-shaft 2 including the armature shaft 11. Thus, the nut section 19 that provides another point of support can be placed in position after any possible misalignment of the rack-shaft 2 is accommodated. In other words, gap absorbing and friction reducing can be accomplished by positionally regulating the housing B. Therefore, rigorous precision requirements for the parts and assembling is unnecessary and the cost of manufacturing the power steering unit is reduced.

Additionally, since the housing B can be arranged in position after measuring the performance of the electric motor 1 per se, it is not necessary to conduct the cumbersome operations required for conventional power steering units including that of removing the yoke 7 placed in position in order to mount the electric motor 1. Thus, the process for assembling the power steering unit is greatly simplified and the performance of the electric motor 1 can be obtained accurately and easily under actual operating conditions without removing the yoke 7.

The housing A is fitted to the vehicle main body by means of a bracket 9 with an elastic member such as a rubber member interposed between them. It should be noted that, in conventional power steering units, the housing located close to the steering column is rigidly secured to the vehicle main body and hence the sounds and vibrations generated by the electric motor 1 can easily be transmitted to the steering wheel to get the steering feeling worse. To the contrary, in this power steering unit, as the housing A is secured by means of a bracket 9 and a rubber member is arranged between the bracket 9 and the housing A, the sounds and vibrations are damped there and prevented from being transmitted further to the steering column 5.

Now, the embodiment of power steering unit of the invention operates in a manner as described below. Firstly, as the steering wheel is operated by the driver to turn the steering column 5 and the rack-shaft 2 is moved in the direction corresponding to the sense of rotation of the steering column 5 to carry out a necessary steering operation. At the same time, a steering torque sensor (not shown) detects the torque generated by the rotary motion of the steering column 5 and consequently the commutator 22 is supplied with electric power corresponding to the detected torque from the terminal plate 26 having the coupler 28 via the brush 23. As the electric motor 1 is driven to operate the armature shaft 11 and hence the nut section 19 coupled to it are rotated. As the nut section 19 rotates, the steering assisting power is transmitted to the rack-shaft 2 under the effect of the ball-and-screw mechanism 3, whereby the movement of the rack-shaft 2 is promoted and the steering power is assisted.

In the present power steering, even in the case that the rack-shaft 2 is stopped, being abutted against a stopper (not shown), owing to rest swing or to rapid steering at the time of vehicle maintenance, reaction force in the axial direction produced in the rack-shaft 2 due to inertia of the armature shaft 11 is not transferred. Namely, such reaction force is transferred from the rack-shaft 2 through the ball-and-screw mechanism 3, the angular bearing 4, the housing B, the yoke 7, and the housing A. In the armature shaft 11, is generated only force in the rotational direction due to its inertia. Accordingly, strength requirement for the armature shaft 11 becomes lower, and the production cost can be reduced.

(Embodiment 2)

Figure 5:
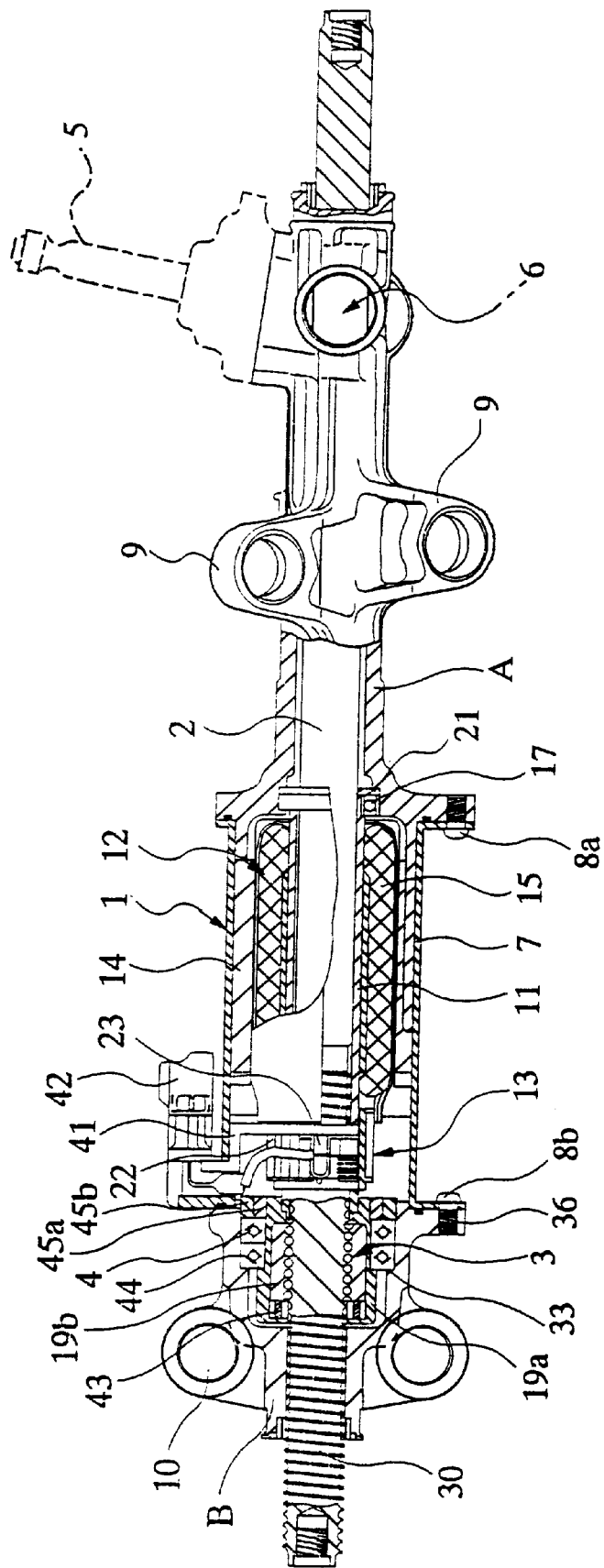
FIG. 5 is a schematic cross sectional view of a second embodiment of power steering unit according to the invention, showing its overall configuration.

FIG. 5 is a schematic cross sectional view of a second embodiment of power steering unit according to the invention, showing its overall configuration. Here, like numerals are used for like parts common to the power steering unit of Embodiment 1, and their detailed description is omitted.

The power steering unit of Embodiment 2 has fundamental structure generally similar to the power steering unit of Embodiment 1. As shown in FIG. 5, however, the power supply section 13 is located in the left of the field device 12 in the drawing, i.e. on the side of the housing B. This construction contributes to accuracy between the commutator 22 and the brushes 23 and rigidity, while maintaining the two supporting points structure for the rack-shaft 2.

As shown in FIG. 5, in the present power steering unit, the armature core 15 is mounted in the reverse direction in comparison with the one of FIG. 1, and its power supply section 13 is provided on the side of the housing B relative to the armature core 15. In other words, the commutator 22 and the brushes 23 are arranged in the neighborhood of the ball-and-screw mechanism 3 and the angular bearing 4, in contrast with the case of FIG. 1.

On the other hand, the armature shaft 11 is connected with the nut section 19 of the ball-and-screw mechanism 3 similarly to the case of FIG. 1, and also, the nut section 19 is supported by the angular bearing 4 fixed to the housing B. Thus, the armature shaft 11 is supported at its one end by the housing B through the nut section 19 and the angular bearing 4. Further, the commutator 22 is fixed to the armature shaft 11. In these features, the apparatus of FIG. 5 is not different from the apparatus of FIG. 1.

In the present apparatus shown in FIG. 5, a nut 19b is inserted into an inside of a nut holding cylinder 19a, and a lock nut 43 having a male thread cut in its outer periphery is screwed to be coupled with a female thread cut in inner periphery of an opening end of the nut holding cylinder 19a, so as to fix the nut 19b being prevented from relative rotation. The angular bearing 4 is fixed to a stepped portion 44 of the nut holding cylinder 19b with an inside-screw lock nut 45a, and is mounted and fixed to the housing B with an outside-screw lock nut 45b so as to be locked in its movement in the axial direction.

As for supporting points of the armature shaft 11, left side (as seen in the drawing) of the armature shaft 11 is supported by the nut section 19 which, in turn, is supported by the housing B. On the other hand, right side (as seen in the drawing) of the armature shaft 11 is supported by the bearing 17 which, in turn, is supported by the housing A. In that case, the housing B is directly fitted to the vehicle body through the fitting holes 10, while the housing A is fitted to the vehicle body through the bracket 9 via elastic body such as rubber. In other words, the housing B has higher mounting rigidity than the housing A. Further, the support by the angular bearing 4 is more accurate than the support by the bearing 17. From these, mounting accuracy and rigidity of the armature shaft 11 are higher on the side of the housing B than on the side of the housing A.

Accordingly, to improve mounting accuracy and rigidity of the commutator 22, in the present power steering unit of Embodiment 2, the commutator 22 is arranged on the side of the housing B relative to the field device 12, in contrast with the power steering unit of Embodiment 1, in which the commutator 22 is arranged on the side of the housing A. Namely, the commutator 22 is located, in the armature shaft 11, near to the supporting point which is superior in the mounting accuracy and rigidity than the case of FIG. 1. By this, the commutator 22 can be assembled in a state of higher rigidity and accuracy.

Further, in relation to the brushes 23, mounting accuracy of the commutator 22 is improved. Accordingly, mounting accuracy between them is improved also, and it is possible to attain reduction in brush sound, reduction of lead angle displacement, improvement in commutation, etc.

Also in the apparatus of FIG. 5, the rack-shaft 2 is supported by the two points, i.e. the coupling section 6 with the steering column 5 in the housing A and the nut section 19 of the ball-and-screw mechanism 3, and, as a matter of fact, two-point supporting structure is realized similarly to Embodiment 1, of course. Further, in the apparatus of FIG. 5, is employed construction that the brush holders 41 and the coupler 42 are united, thus reducing cost owing to reduction in the parts number and in the number of the assembling processes.

In the previous Embodiment 1, the housing B is directly fitted to the vehicle body through the fitting holes 10. On the other hand, the present Embodiment 2 is characterized in that the power supply section 13 of the armature core 15 is placed on the side of the housing B, and, accordingly, form of mounting the apparatus to the vehicle body is not limited to the above example. For example, it may be mounted to the vehicle body through the bracket 9 without providing the fitting holes 10.

As described above, the invention made by the present inventor has been described in detail based on the embodiments. The present invention, however, is not limited to the above-described embodiments, and can be varied in may ways within the scope of the invention.

For example, while each of the above embodiments is composed of three major components of the housing A, the housing B and the yoke 7, they may be differently arranged, for example, the housing A and the yoke 7 may be combined into a unitary component so long as the rack-shaft 2 is supported by two points.

Further, a brushless electric motor may be used for an power steering unit according to the invention. If such is the case, the field device has a core and magnets respectively arranged on the yoke side and the armature shaft side while the power supply section has a circuit board comprising conducting means and a detector for detecting the angular position of the armature shaft. Additionally, the present invention is applicable not only to front wheels steering unit but also to rear wheels steering unit having the same constitution and mounting condition as the front wheels steering unit.

Finally, while the present invention is described particularly in terms of power steering unit of motor vehicle, it may be applied to any industrial machines and vehicles provided with a steering system.

The advantages of the present invention may be summarized as follows.

Since the rack-shaft is not supported by three points such as the conventional power steering unit but supported by two points, the precision requirement for machining and assembling the components are eased and hence the manufacturing cost thereof is reduced. Additionally, jarring and an unpleasant steering feeling may sense due to the gap and rub of the rack-shaft can be effectively avoided.

The second housing for containing and retaining the ball-screw mechanism is positionally regulatable. This allows any misalignment to be corrected that may occur when the second housing is arranged in position.

By arranging the power supply section of the motor on the side of the second housing, the power supply section can be assembled in a state of high rigidity and high accuracy. Accordingly, it is possible to obtain reduction in brush sound, reduction in lead angle displacement, improvement in commutation, etc.

What is claimed is:

1. An electric power steering unit comprising:

a rack-shaft defining a plurality of teeth, and a screw section, adapted to be coupled to a vehicle's wheels;

a first housing for slidably containing the rack;

a coupling section retained in the first housing to cause the teeth to engage a pinion forming part of a vehicle's steering column;

an electric motor coaxially arranged around the rack-shaft and having an armature shaft extending therefrom, to supply assisting power to the rack-shaft;

a ball screw mechanism for connecting a nut section linked to the armature shaft of the electric motor with the screw section, the ball screw mechanism including a plurality of ball members disposed between the nut section and the screw section, during operation, the ball screw mechanism transmits rotary power from the electric motor to the rack shaft thereby providing assisting power for steering;

the nut section being rotatably supported by a second housing the second housing supporting said armature shaft;

said rack-shaft being axially movable and supported at two support points, one at said coupling section, and the other at said nut section supported by said second housing;

the motor having a power supply section arranged on a side of said second housing relative to a field device of said electric motor; and a coupler projecting radially from the power steering unit to facilitate the wiring of the power supply section to a power source without hindering the mounting of the power steering unit to a vehicle.

* * * * *